US012696912B2

(12) United States Patent
Napolitano et al.

(10) Patent No.: US 12,696,912 B2
(45) Date of Patent: Aug. 4, 2026

(54) COATING MADE OF COOKIE DOUGH, PRODUCTION OF A COATING MADE OF COOKIE DOUGH, CONFECTIONARY COATED WITH COOKIE DOUGH, AND PROCESS OF MAKING CONFECTIONARY COATED WITH COOKIE DOUGH

(71) Applicant: SOCIETE DES PRODUITS NESTLE S.A., Vevey (CH)

(72) Inventors: Guillermo E. Napolitano, Bakersfield, CA (US); Sravanti Paluri, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 707 days.

(21) Appl. No.: 17/998,596

(22) PCT Filed: May 12, 2021

(86) PCT No.: PCT/EP2021/062763
§ 371 (c)(1),
(2) Date: Nov. 11, 2022

(87) PCT Pub. No.: WO2021/229022
PCT Pub. Date: Nov. 18, 2021

(65) Prior Publication Data
US 2023/0180786 A1      Jun. 15, 2023

Related U.S. Application Data

(60) Provisional application No. 63/025,570, filed on May 15, 2020.

(51) Int. Cl.
| | |
|---|---|
| *A23G 9/32* | (2006.01) |
| *A23G 9/40* | (2006.01) |
| *A23G 9/48* | (2006.01) |

(52) U.S. Cl.
CPC ............. *A23G 9/322* (2013.01); *A23G 9/327* (2013.01); *A23G 9/40* (2013.01); *A23G 9/48* (2013.01)

(58) Field of Classification Search
None
See application file for complete search history.

(56) References Cited

U.S. PATENT DOCUMENTS

| | | | |
|---|---|---|---|
| 6,017,571 A | 1/2000 | Cross et al. | |
| 2008/0044542 A1 | 2/2008 | Reeves-Collins et al. | |

FOREIGN PATENT DOCUMENTS

| | | | | |
|---|---|---|---|---|
| EP | 1302112 A1 * | 4/2003 | .............. | A23G 9/48 |
| JP | 0152147 A * | 3/1989 | | |
| WO | 2010077020 | 7/2010 | | |
| WO | 2017055520 A1 | 4/2017 | | |

OTHER PUBLICATIONS

Translation.*
Anonymous "Brownie Chip Cookie Dough Ice Cream" Mintel, Apr. 7, 2020, 4 pages, XP055827182.
Anonymous "Triple Chocolate Cookie Dough" Mintel, Mar. 17, 2020, 4 pages, XP055827205.
Chinese Office Action for Appl No. 202180034769.3 dated Sep. 25, 2024, 9 pages.
Koh et al. "Effect of Sugar Particle Size and Level on Cookie Spread" Journal of the East Asian of Dietary Life, 1997, vol. 7, No. 2, pp. 159-165.
Boz "Effect of flour and sugar particle size on the properties of cookie dough and cookie" Czech Journal of Food Sciences, 2019, vol. 37, No. 2, pp. 120-127.
Mamat et al. "Strucrural and functional properties of major ingredients of biscuit" International Food Research Journal, Apr. 2018, vol. 25, No. 2, pp. 462-471.

* cited by examiner

*Primary Examiner* — Jyoti Chawla
(74) *Attorney, Agent, or Firm* — K&L Gates LLP

(57)      ABSTRACT

A composition for coating a frozen confectionary includes a fat blend containing (i) an emulsifier that is preferably lecithin, (ii) at least one hardening fat that is preferably one or more of palm oil, palm oil mid fractions, or palm oil soft fractions, (iii) one or more soft oils that preferably include canola oil, and (iv) anhydrous milk fat. The coating composition also includes flour and sugars. The composition has a particle size of about 40 μm to about 200 μm, preferably about 90 μm to about 120 μm, and has the sensory characteristics, such as appearance, flavor and texture, of raw cookie dough. Optionally the composition further includes one or more of milk powder, salt or flavor. Preferably the frozen confectionary coated by the composition is an ice cream bar.

18 Claims, 7 Drawing Sheets

| Bar Weight (g) | Coating Temp °C | Drip Time (s) | Total Weight (g) | Pick Up Weight (g) |
|---|---|---|---|---|
| 55.4 | 41° | 14 | 75.8 | 20 |
| 55.6 | 36° | 14 | 76.2 | 21 |
| 56.0 | 35° | 13 | 79 | 22 |
| | | | | 23 (w/5% Cocoa Nibs) |

FIG. 2

| | Second Cookie Dough | Chocolate Ganache | Method |
|---|---|---|---|
| PV (cP) | 707.3 704.9 | 450-800 | Brookfeild, at 40 °C, #27 Spindle. Shear at 50 rmp for 3 min. Then Increase Speed Through the Series: 1; 2.5; 5; 10; 20; 50 rpm. |
| YV (D/cm$^2$) | 2.39 2.47 | 12-20 | |

FIG. 3

COATING MADE OF COOKIE DOUGH, PRODUCTION OF A COATING MADE OF COOKIE DOUGH, CONFECTIONARY COATED WITH COOKIE DOUGH, AND PROCESS OF MAKING CONFECTIONARY COATED WITH COOKIE DOUGH

CROSS REFERENCE TO RELATED APPLICATIONS

The present application is a National Stage of International Application No. PCT/EP2021/062763, filed on May 12, 2021, which claims priority to U.S. Provisional Patent Application No. 63/025,570, filed on May 15, 2020, the entire contents of which are being incorporated herein by reference.

BACKGROUND

The present disclosure relates generally to food products and processes of making a food product, in particular a coating that has sensory attributes of raw cookie dough, such as the appearance, flavor and the texture of raw cookie dough.

Raw cookie dough pieces are popular as inclusions in ice cream. In an ice cream sandwich, the cookie dough is typically cooked or baked. Other products such as 'mochi' or ice cream bites use cookie dough to envelop the entire product, typically in the shape of a small ball. However, these are co-extruded or moulded products, and the coating or 'skin' cannot be used for a dipping application for extruded or moulded bars such as those used in industrial manufacture. Furthermore, a 'mochi' coating is typically made of rice flour and thus does not provide the flavor and the texture of a typical raw cookie dough.

SUMMARY

As disclosed herein, a series of trials investigated cookie dough coatings for a frozen confectionary, and the cookie dough coatings used different oil blends (containing palm, canola, coconut and soybean oils and milkfat), oil content, levels of milk powder, wheat flour, vanilla, sugar type and sugar level. Particle size and melt of blends were also varied.

As a result of these investigations, the present disclosure surprisingly provides a coating for a frozen bar confection that delivers the sensory characteristics of a raw cookie dough. A non-limiting example of the coating can comprise flour (e.g., wheat flour that is heat-treated but not baked), one or more sugars (e.g., dark brown sugar, light brown sugar, granulated sugar, confectioners sugar, or a combination thereof), one or more fats (e.g., canola, palm and coconut oils, anhydrous milk fat, or a combination thereof), an emulsifier (e.g., lecithin such as soy lecithin), optionally salt, optionally milk powder (e.g., skimmed milk powder), and optionally a flavoring. The coating can be made by blending and milling these ingredients through a mill (e.g., a ball mill) at a heated temperature (e.g., 35° C.). The milled material can be used to coat a frozen confectionary (e.g., an ice cream bar), for example by one or more of dipping, enrobing or layering, for example at a temperature of 24° C. to 50° C. (although other temperatures are used in some embodiments). The coating can have a viscosity compatible with conventional dipping operations, but when the coating is set on the frozen confectionary, the coating preferably delivers a doughy texture and an appearance of raw cookie dough, with a gritty mouth feel.

The setting time of the coating can be 5 seconds to 60 seconds depending on the configuration of factory production lines. As used herein, "setting time" is the time after dipping until the coating is sufficiently non-sticky to be wrapped in packaging that contacts the coating.

An advantage of one or more embodiments disclosed herein is an improved coating made of cookie dough.

Another advantage of one or more embodiments disclosed herein is an improved process of applying a coating made of cookie dough to a frozen confectionary such as an ice cream bar.

Yet another advantage of one or more embodiments disclosed herein is the combination of the desired taste and texture of cookie dough with other sought-after food products such as ice cream.

A further advantage of one or more embodiments disclosed herein is to provide a cookie dough food product in a unique and more convenient form.

Another advantage of one or more embodiments disclosed herein is to retain the desired taste and consistency of cookie dough but allow the cookie dough to be available in a wider range of products than previously possible.

Yet another advantage of one or more embodiments disclosed herein is a coating made of cookie dough having a yield value and adhesive properties sufficient to be applied to extruded ice cream bars.

A further advantage of one or more embodiments disclosed herein is to provide a coating made of cookie dough that includes inclusions such as chocolate chips and/or cocoa nibs. Cocoa nibs are particularly preferred inclusions because they will not melt when the coating is prepared, and furthermore the fat in the coating together with the cocoa nibs resembles the taste and texture of chocolate pieces when the coating is eaten.

Another advantage of one or more embodiments disclosed herein is a bar that combines rich and creamy ice cream with a soft cookie dough coating.

Additional features and advantages are described herein and will be apparent from the following Figures and Detailed Description.

BRIEF DESCRIPTION OF DRAWINGS

FIG. 2 is a table showing results of the performance of the second coating in a dipping test on an ice cream bar, from the experimental example disclosed herein.

FIG. 3 is a table showing plastic viscosity (PV) and yield value (YV) for the second coating compared to Ganache chocolate coating, from the experimental example disclosed herein.

DETAILED DESCRIPTION

Definitions

Figure 1:
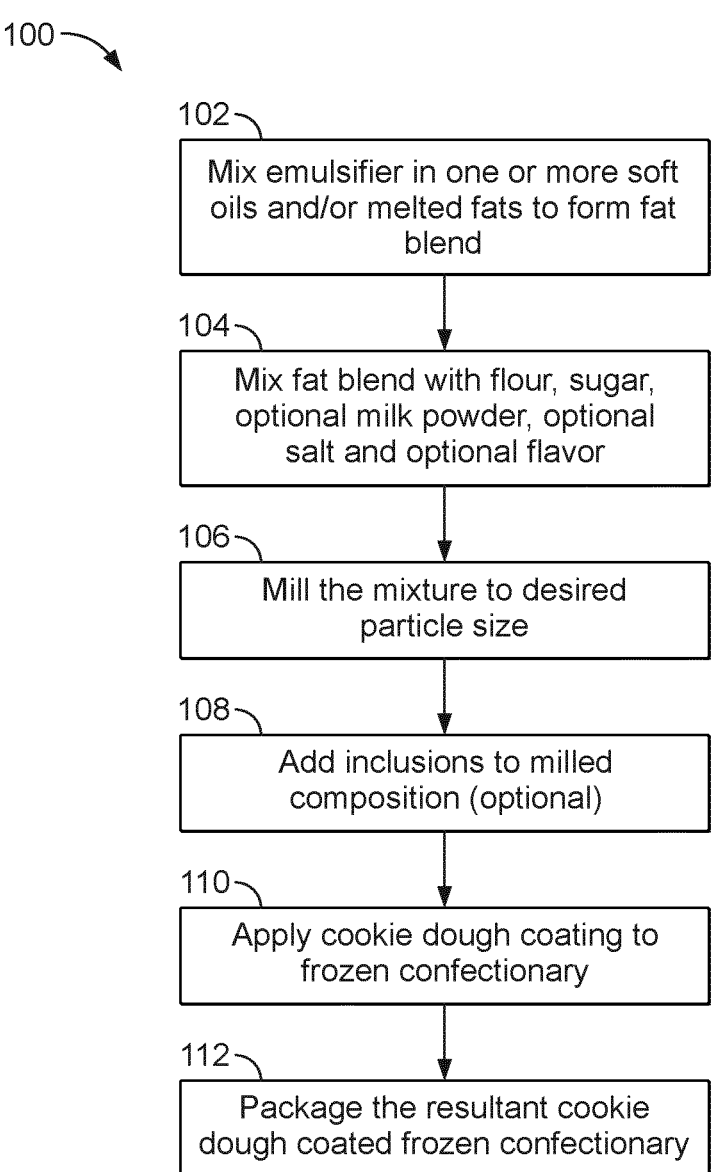
FIG. 1 is a flowchart of an embodiment of a process of making a cookie dough coated food product.

Some definitions are provided hereafter. Nevertheless, definitions may be located in the "Embodiments" section below, and the above header "Definitions" does not mean that such disclosures in the "Embodiments" section are not definitions.

All percentages expressed herein are by weight of the total weight of the referenced composition unless expressed otherwise. As used herein, "about," "approximately" and "substantially" are understood to refer to numbers in a range of numerals, for example the range of −10% to +10% of the referenced number, preferably-5% to +5% of the referenced number, more preferably-1% to +1% of the referenced number, most preferably-0.1% to +0.1% of the referenced number.

All numerical ranges herein should be understood to include all integers, whole or fractions, within the range. A range "between" two values also includes the two values. For example, "20 minutes to 200 minutes" includes 20 minutes and includes 200 minutes. Moreover, the disclosed numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "an oil" or "the oil" includes one oil but also two or more oils.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. Where used herein, the terms "example" and "such as," particularly when followed by a listing of terms, are merely exemplary and illustrative and should not be deemed to be exclusive or comprehensive.

The term "and/or" used in the context of "X and/or Y" should be interpreted as "X," or "Y," or "X and Y." Similarly, "at least one of X or Y" should be interpreted as "X," or "Y," or "both X and Y." For example, "table sugar and/or brown sugar" and "at least one of table sugar or brown sugar" mean "table sugar," or "brown sugar," or "both table sugar and brown sugar."

The terms "food," "food product" and "food composition" are used interchangeably and mean a product or composition that is intended for oral ingestion by an individual, such as a human, and provides at least one nutrient to the individual. The food products of the present disclosure, including the many embodiments described herein, can comprise, consist of, or consist essentially of the elements disclosed herein, as well as any additional or optional ingredients, components, or elements described herein or otherwise useful in a diet.

As used herein, "fat" means any lipid, including "oils" which are lipids that are liquid at room temperature and also including lipids that are solid at room temperature.

As used herein, particle size may be determined using a Malvern particle sizer, with medium chain triglyceride oil as the dispersant. Particle size is analyzed at fraction less than 10%, 50%, 90% and are calculated with the Malvern software based on the Mie theory. In the context of this application, the particle sizes are values at 90%. Equipment that may be used is a Chocolate Particle Size Analyzer, Malvern Mastersizer Micro with size range: 0.3 μm to 300 μm.

Embodiments

An aspect of the present disclosure is a food composition that is cookie dough and has properties such that the food composition can be coated on a frozen confectionary such as an ice cream bar. Another aspect of the present disclosure is a food product that is a frozen confectionary coated by the cookie dough composition.

In a preferred embodiment, the food composition is a cookie dough applied to an extruded vanilla ice cream bar as a coating. Herein the food composition is referenced as "a coating" or "the coating," but these terms not only cover the food composition coated on a frozen confectionary but also the food composition on its own, separate from another food product such as a frozen confectionary, for example prior to being applied to the other food product. Preferably the coating is substantially homogeneous, other than any optional inclusions.

When the coating is applied to a frozen confectionary such as an ice cream bar, preferably the coating covers at least 90% of the exterior surface of the frozen confectionary by area, more preferably the coating covers at least 95% of the exterior surface of the frozen confectionary by area, most preferably the coating covers at least 99% of the exterior surface of the frozen confectionary by area. In some embodiments, the coating covers the entirety of the exterior surface of the frozen confectionary except for an area where a stick is inserted into the frozen confectionary.

In an embodiment, the coating comprises one or more fats in a total amount of about 35% to about 55% of the coating, and more preferably the coating comprises about 45% fat. Preferred fats include one or more of palm oil or fractions thereof; soft oils (oils that are liquid at room temperature of 20° C., such as canola oil); anhydrous milk fat; or lecithin (e.g., soy lecithin). More preferably, the one or more fats are provided by a fat blend comprising palm oil, one or more soft oils (e.g., canola oil), anhydrous milk fat, and lecithin (e.g., soy lecithin). Most preferably, the fat blend consists of palm oil, one or more soft oils (e.g., canola oil), anhydrous milk fat, and lecithin (e.g., soy lecithin).

In particularly preferred embodiments, the fats comprise palm oil that is about 35% to about 65% of the fats in the coating and/or about 12% to about 36% of the coating; one or more soft oils such as canola oil that are about 35% to about 65% of the fats in the coating and/or about 12% to about 36% of the coating; anhydrous milk fat that is about 10% to about 30% of the fats in the coating and/or about 4% to about 17% of the coating; and lecithin (e.g., soy lecithin) that is the remainder of the fats in the coating.

Preferably, the composition comprises less than 3 wt. % lauric fat, preferably less than 2 wt. %, and most preferably the composition is free of lauric fat. The fat blend can have a saturated fat level of below 40 wt. % of the fat blend.

In an embodiment, the coating comprises one or more sugars in a total amount of about 15% to about 50% of the coating, and more preferably the coating comprises about 20% to about 25% sugars. Preferred sugars include one of one or more table sugars, such as granulated sugar or confectioners sugar and/or one or more brown sugars, such as dark brown sugar or light brown sugar. In particularly preferred embodiments, the one or more sugars comprise one or more table sugars in a total amount that is about 0% to about 100% of the sugars in the coating and/or about 0% to about 50% of the coating; and/or one or more brown sugars that are about 0% to about 70% of the sugars (e.g., about 0% to about 65% of the sugars) in the coating and/or about 0% to about 35% of the coating.

In an embodiment, the coating comprises flour such as wheat flour, preferably heat-treated ready-to-eat enriched wheat flour (which has not been baked). For example, the coating can comprise flour such as wheat flour in a total amount of about 10% to about 42% of the coating, more preferably the coating comprises about 20% to about 30% of the flour (e.g., heat-treated wheat flour), and most preferably the coating comprises about 25% of the flour (e.g., heat-treated wheat flour).

In an embodiment, the coating optionally comprises milk powder such as skimmed milk powder. For example, the coating can comprise milk powder such as skimmed milk powder in a total amount of about 0% to about 20% of the coating, and more preferably the coating comprises about 7% to 10% of the milk powder (e.g., skimmed milk powder).

In an embodiment, the coating optionally comprises salt. For example, the coating can comprise salt in a total amount of about 0.3% to about 0.4% of the coating.

In an embodiment, the coating optionally comprises a flavor such as vanilla. For example, the coating can comprise a flavor such as vanilla in a total amount of about 0.1% of the coating.

Preferably the coating has a particle size of about 40 μm to about 200 μm, more preferably about 90 μm to about 120 μm.

In some embodiments, the coating further comprises inclusions such as chocolate chips or cocoa nibs. As used herein, "cocoa nibs" are crushed pieces of cocoa beans. Inclusions such as cocoa nibs can be about 5% to about 10% of the coating by weight.

In some embodiments, the coating has a plastic viscosity of about 650 cP to about 750 cP, preferably about 670 cP to about 740 cP, more preferably about 680 cP to about 730 cP, even more preferably about 690 cP to about 720 cP, most preferably about 700 cP to about 710 cP.

In some embodiments, the coating has a yield value of about 1.0 D/cm$^2$ to about 5.0 D/cm$^2$, preferably about 1.25 D/cm$^2$ to about 4.0 D/cm$^2$, more preferably about 1.5 D/cm$^2$ to about 3.5 D/cm$^2$, even more preferably about 2.0 D/cm$^2$ to about 3.0 D/cm$^2$, most preferably about 2.3 D/cm$^2$ to about 2.5 D/cm$^2$.

Accordingly, preferred embodiments of the composition for coating a frozen confectionary comprise a fat blend comprising (i) an emulsifier, (ii) at least one hardening fat, (iii) one or more soft oils, and (iv) anhydrous milk fat. The coating composition further comprises flour and sugars. The coating composition has a particle size of about 40 μm to about 200 μm, preferably 90 μm to about 120 μm. The fat blend is preferably about 35% to about 55% of the composition, more preferably about 45% of the composition.

The emulsifier can be selected from the group consisting of soy lecithin, sunflower lecithin, canola lecithin, and mixtures thereof, preferably in an amount of 0.1 wt. % to 2.0 wt. % of the composition.

The one or more soft oils can be selected from the group consisting of canola oil, sunflower oil, safflower oil, soybean oil, algal oil, peanut oil, olive oil, macademia nut oil, seed oil, hazelnut oil, avocado oil, and mixtures thereof. Preferably, the one or more soft oils are present in a total amount that is about 35% to about 65% of the fat blend and/or about 12% to about 36% of the composition.

The at least one hardening fat can be selected from the group consisting of palm oil, palm oil mid fractions, palm oil soft fractions, and mixtures thereof. Preferably, the at least one hardening fat is a total amount of about 35% to about 65% of the fat blend and/or about 12% to about 36% of the composition.

Preferably, the anhydrous milk fat is about 10% to about 30% of the fat blend and/or about 4% to about 17% of the composition.

The fat blend preferably consists of the at least one hardening fat, the one or more soft oils, the anhydrous milk fat, and the emulsifier such that the only fats in the composition are the fat blend, any fat in the flour, and any fat in optional inclusions.

In some embodiments, the one or more sugars are in a total amount of about 15% to about 50% of the composition, preferably about 20% to about 25% of the composition, and preferably comprise one or more table sugars and one or more brown sugars. In some embodiments, the flour is about 10% to about 42% of the composition, preferably about 20% to about 30% of the composition, and preferably comprises heat-treated wheat flour that optionally is unbleached.

Optionally, the coating composition further comprises at least one additional ingredient selected from the group consisting of milk powder up to about 20% of the composition, salt that is about 0.3% to about 0.4% of the composition, and a flavor that is about 0.1% of the composition.

Optionally, the coating composition further comprises inclusions that are at least one of chocolate chips or cocoa nibs.

Preferred embodiments of a food product comprise a frozen confectionary that is coated by any embodiment of the coating composition. The frozen confectionary is preferably moulded or extruded, and a particularly preferred frozen confectionary is an extruded bar having a surface roughness and a cold temperature that lead to better adherence of the coating composition on the frozen confectionary. The food product can further comprise a stick inserted into the frozen confectionary for holding the coated frozen confectionary.

Another aspect of the present disclosure is a method of making a coating for a frozen confectionary, and yet another aspect of the present disclosure is a method of coating a frozen confectionary with cookie dough. As shown in FIG. 1, an embodiment of a method 100 comprises mixing lecithin (e.g., soy lecithin) with one or more fats to form a fat blend (Step 102).

Preferred fats include one or more of palm oil; soft oils (oils that are liquid at room temperature of 20° C., such as canola oil); anhydrous milk fat; or lecithin (e.g., soy lecithin). More preferably, the one or more fats are provided by a fat blend comprising palm oil, one or more soft oils (e.g., canola oil), anhydrous milk fat, and lecithin (e.g., soy lecithin). Most preferably, the fat blend consists of palm oil, one or more soft oils (e.g., canola oil), anhydrous milk fat, and lecithin (e.g., soy lecithin) such that these fats are the only fats in the composition, along with any oil in the flour, and any fat in optional inclusions.

The method 100 can comprise mixing the fat blend with one or more sugars, flour, optionally milk powder, optionally salt, and optionally a flavor (Step 104). In some embodiments, at least a portion of Step 102 and at least a portion of Step 104 can be performed concurrently. For example, at least a portion of the lecithin can be mixed with at least a portion of the other fats and at least a portion of the other ingredients concurrently.

Preferred sugars include at least one of one or more table sugars, such as granulated sugar or confectioners sugar; or one or more brown sugars, such as dark brown sugar or light brown sugar. Preferred flour includes wheat flour, such as heat-treated ready-to-eat enriched wheat flour. Preferred milk powder includes skimmed milk powder.

The method 100 can comprise milling the mixture to a target particle size to thereby form the coating composition (Step 106). In a preferred embodiment, the milling can comprise subjecting the mixture to a ball mill, but any refining device can be used, such as roll refiners, as long as the target particle size can be achieved. Additionally or alternatively, one or more ingredients of the mixture such as flour and/or sugar can be obtained already in the target particle size. Preferably the coating has a particle size of about 40 μm to about 200 μm, more preferably about 90 μm to about 120 μm.

In some embodiments, at least a portion of Step 102 and/or at least a portion of Step 104 can be performed concurrently with Step 106. For example, at least a portion of the lecithin, at least a portion of the other fats, and/or at least a portion of the other ingredients can be mixed during milling.

The method 100 can optionally comprise adding inclusions, such as chocolate chips and/or cocoa nibs, to the coating (Step 108).

The method 100 can comprise applying the coating to a frozen confectionary to thereby coat the frozen confectionary (e.g., an ice cream bar), for example by one or more of dipping, enrobing or layering, for example at a temperature of about 24° C. to about 50° C. (Step 110). The setting time of the coating is preferably about 5 seconds to about 60 seconds.

An "ice cream bar" or "frozen confectionary" as used herein means a substantially solid food product comprising a dairy ingredient, such as milk solids-non-fat, and/or a dairy substitute, such as a plant-based frozen confection. An ice cream bar has a form that is a substantially homogeneous and has a length at least about twice greater than its width and/or its thickness, preferably at least about three times greater than its width and/or its thickness. The ice cream bar is preferably extruded and/or moulded.

The method 100 can comprise packaging the frozen confectionary coated with the cookie dough composition (Step 112). The packaged coated frozen confectionary can then be transported and sold to a consumer. In some embodiments, a single serving of the frozen confectionary coated with the cookie dough composition is provided in a container such as a sealed bag. As used herein, the term "serving" refers to a predetermined quantity of the food product.

In some embodiments, multiple servings of the food product can be individually packaged and provided to a consumer in a container. For example, a plurality of individually packaged food products (e.g., sealed bags that each contain a serving of the frozen confectionary coated with the cookie dough composition) can be provided to the consumer in a box that holds the plurality of the individually packaged food products, such as two, four, six, eight, ten or twelve individually packaged food products. Preferably the plurality of individually packaged food products are substantially the same predetermined quantity of the food product as each other.

Accordingly, in preferred embodiments, a method of making a composition for coating a frozen confectionary comprises milling a mixture to a particle size of about 40 μm to about 200 μm. The mixture comprises a fat blend comprising (i) an emulsifier that preferably is lecithin, (ii) at least one hardening fat that preferably is one or more of palm oil, palm oil mid fractions, or palm oil soft fractions, (iii) one or more soft oils, and (iv) anhydrous milk fat; the mixture further comprising flour, sugars, and optional salt, optional skimmed milk powder, and optional flavoring.

The method can comprise mixing the emulsifier (e.g., lecithin) with the palm oil or fraction thereof, the one or more soft oils, and the anhydrous milk fat to form the fat blend; then mixing the fat blend with the flour and the sugars to form the mixture before the milling.

The method can further comprise adding inclusions that are at least one of chocolate chips or cocoa nibs to the milled mixture or added separately on to the surface of the coating as a subsequent step of dry coating.

In preferred embodiments, a method of coating a frozen confectionary comprises applying any embodiment of the coating composition to the frozen confectionary, preferably by one or more of dipping, enrobing or layering. The applying of the composition to the frozen confectionary can be performed at a temperature of about 24° C. to about 50° C. A setting time of the coating is about 5 seconds to about 60 seconds, preferably 45 to 60 seconds. The present disclosure also includes a food product made by this coating method.

EXAMPLE

The following non-limiting experimental example generally illustrates one or more embodiments provided by the present disclosure.

Introduction

The product is cookie dough bars combining rich and creamy ice cream with a soft cookie dough coating. The development was expected to deliver a raw cookie dough coated bar (flavor, grit, texture) with randomly applied chocolate chips or cocoa nibs by mixing with dough coating or by a separate step of dry coating on moulded or extruded bars.

Methodology

All coatings were made in 5 kg batches using a ball mill. Briefly, the ball mill before use was cleaned using a mixture of sugar and fat with the composition of the coating. The ball mill (Caotech, Type CAO-B5, Wormerveer, NL) was ran at 32-35° C. at a speed set of 5 for 5-30 minutes depending on starting material particle size until the target particle size of 40-200 μm was obtained. Particle size was determined manually using a micrometer. The finished coating was then passed to a 400 μm metal sieve to eliminate the risk of foreign bodies.

The basic ingredients used for the formulation of the cookie dough coatings were palm oil, canola oil, anhydrous milk fat, coconut oil, granulated or confectioner's sugar, skim milk powder, sterile wheat flour, dark brown sugar, salt, soy lecithin and vanilla flavor. Further information on the ingredients and materials are provided for the individual trials hereafter.

A first coating was made using the following ingredients: palm oil, canola oil, anhydrous milk fat, soy lecithin, skim milk powder, vanilla, wheat flour, dark brown sugar, and salt. This mixture was subjected to the ball mill at 35° C. to achieve a target particle size of 90.0 μm±2.0 μm.

The first coating was applied to vanilla ice cream bars. Specifically, dipping of extruded 3 oz. vanilla bars with the first coating was performed. Ice cream bar temperature was −17° C., and coating temperature was 38-40° C.

Based on feedback regarding the first coating, a second coating was made using the following ingredients: palm oil, canola oil, anhydrous milk fat, soy lecithin, granulated sugar, skim milk powder, vanilla, wheat flour, dark brown sugar, and salt. This mixture was subjected to the ball mill at 35° C. to achieve a target particle size of 120.0 μm+10.0 μm. The resultant coating was applied to vanilla ice cream bars.

The second coating was applied to vanilla ice cream bars. Specifically, dipping of extruded 3 oz. vanilla bars with the first coating was performed. Ice cream bar temperature was −17° C., and coating temperature was 38-40° C.

Relative to the first coating, the second coating had higher milk fat for a buttery note, larger particles (120 μm versus 90 μm) for more grit, lesser fat (−2%) to accommodate for yield value decrease due to larger particles, more skim milk powder to enhance dairy note, more vanilla, and lesser dark brown sugar to decrease the maple note. To achieve a target coating pick up weight of about 20 g to 23 g on vanilla ice cream bars, the dipping temperatures were in the range of 38-40° C.

However, at these dipping temperatures, any chocolate chip or morsel used as inclusion will be melted. A third coating was formulated that could be used for dipping at room temperature. The third coating contained the same basic ingredients of the previous coatings, but the fat phase of the third coating only consisted of canola and coconut oils and remained liquid at room temperature. Specifically, the third coating was made using the following ingredients: canola oil, soy lecithin, coconut oil, granulated sugar, skim milk powder, vanilla, wheat flour, dark brown sugar, and salt. This mixture was subjected to the ball mill at 95° F. to achieve a target particle size of 120.0 μm±10.0 μm.

Chocolate chips were mixed with the third coating such that the chocolate chips were 7% of the coating by weight. Then the third coating was applied to vanilla ice cream bars.

Sensory evaluations were conducted for the first and second coatings. Specifically, experienced tasters evaluated target appearance, flavor and texture of the coating using the coating standards. In addition, coating performance was tested for the first, second and third coatings.

Results

The first coating was tested for dipping on extruded 3 oz. vanilla ice cream bars. The performance of the first coating at bench scale was favorable under standard ice cream coating conditions, showing a pick up weight of about 20 g and a drip/dry time of 13 seconds to 15 seconds. The drip/dry time is the amount of time after withdrawal of the coated bar from the coating composition until the coating on the bar stops dripping.

Flavor and texture of the first coating was close to the target. However, the consensus of the experienced tasters provided the following feedback:

Appearance/color of coating on target

Texture was close to target, with a cookie dough "grit" from sugar

Flavor of the coating leaned more towards maple/caramel in flavor

Noticeable raw flour taste

Needs more/larger sugar grit granules

By dough grading standards, there was notes of vanilla, butter, salt

Desire for a more milky and more buttery tasting thicker coating to contribute to the cookie dough texture, it should be much thicker than a chocolate coating In order to address the feedback received and the product grading standards presented for the first coating, the second coating was formulated with the following directional changes:

Increased particle size from 90 μm to 120 μm for more grit.

Increased milk fat for more buttery flavor, skimmed milk powder for the dairy note Increased Vanilla flavor Partial reduction of dark sugar by granulated white sugar to reduce maple/molasses flavor The feedback for the second coating was as follow:

Taste is very close to target, some maple syrup remains, but overall taste is improved compared to the first coating Texture: Graininess has improved Ensure that the coating is thick enough to have a "bite" as cookie dough rather than cookie "jam/syrup"

Need to improve visual on coating-specks of chocolate in the coating are needed.

Results of the performance of the second coating in a dipping test were satisfactory in terms of coating appearance, dry time and pick up weight (FIG. 2).

The plastic viscosity and yield value of the second coating are shown in FIG. 3. The results show that a workable drip time of 14 seconds and a target weight of 23 g can be achieved at a coating dipping temperature of 35° C. This is a relatively low dipping temperature, but it is related to the very low yield value of 2.4 D/cm² the second coating (FIG. 3), which in turn is the result of its large particle size (120 μm).

Figure 4A:
FIGS. 4A and 4B are photographs respectively showing the second coating on extruded vanilla ice cream bars without inclusions and with cocoa nibs, from the experimental example disclosed herein.
Figure 4B:
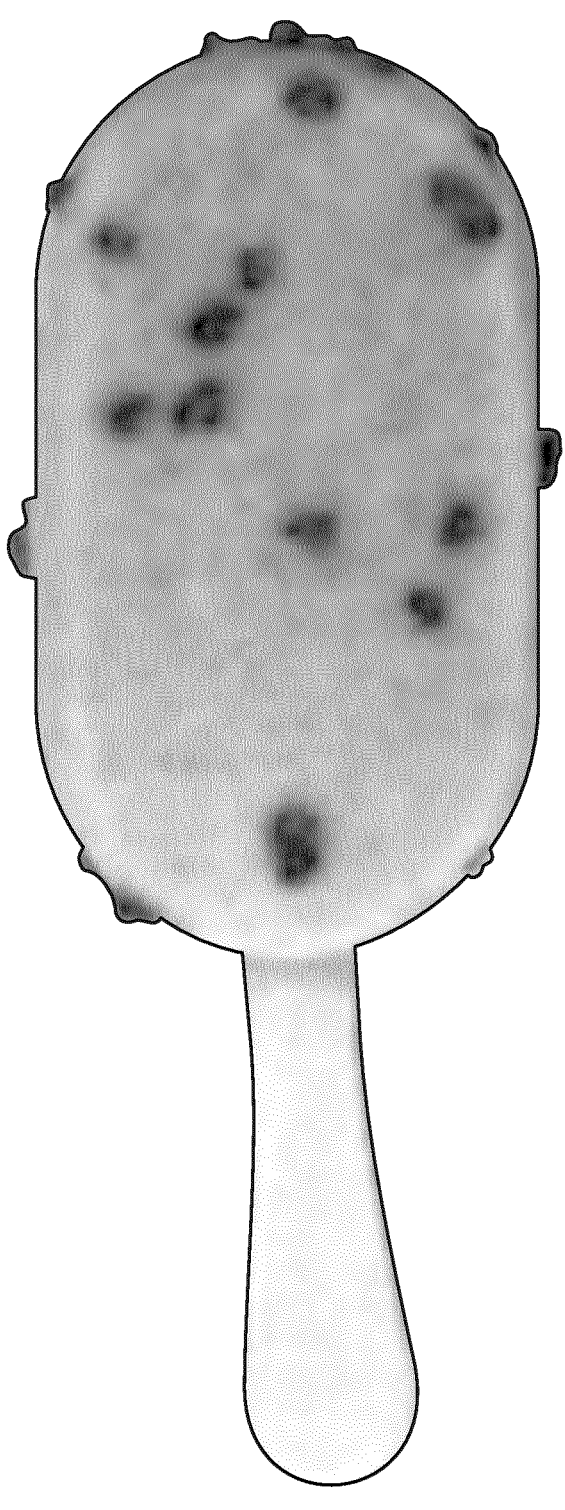

The appearance of the second coating without inclusions and with cocoa nibs (7% by weight) on commercially available extruded ice cream bars is shown in FIGS. 4A and 4B, respectively to demonstrate the feasibility of use in factories. Compared to chocolate chips, cocoa nibs have a hard texture and relatively bitter flavor, but they provide the desired appearance.

Figure 5:
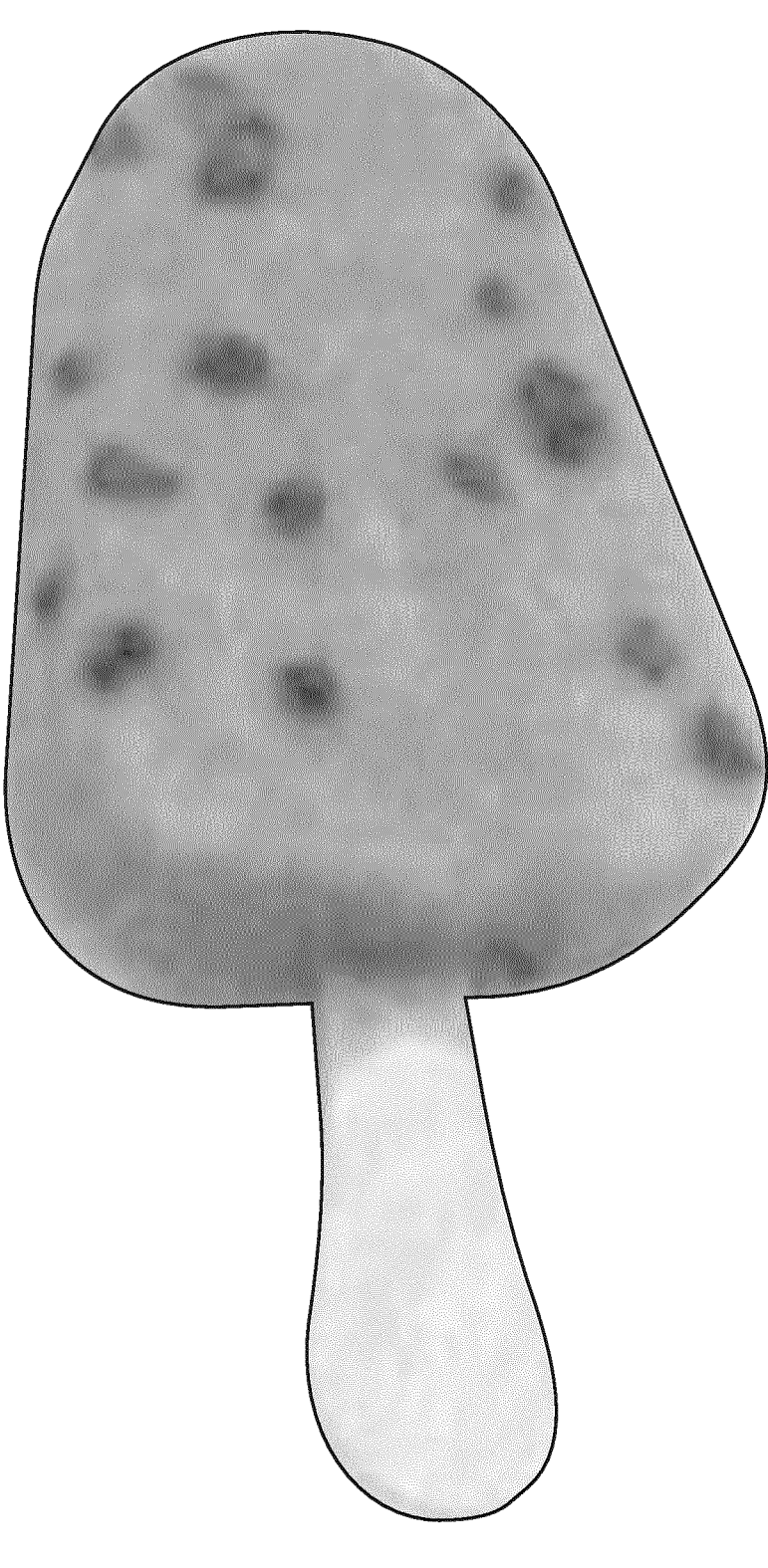
FIG. 5 is a photograph showing the second coating on extruded cookie dough bars containing large inclusions of cookie dough, with cocoa nib inclusions at 5% wt./wt. of the coating, from the experimental example disclosed herein.

In a separate trial, the second coating with 5% cocoa nib inclusions was used to coat commercially available vanilla bars containing large inclusions of cookie dough (FIG. 5).

Figure 6:
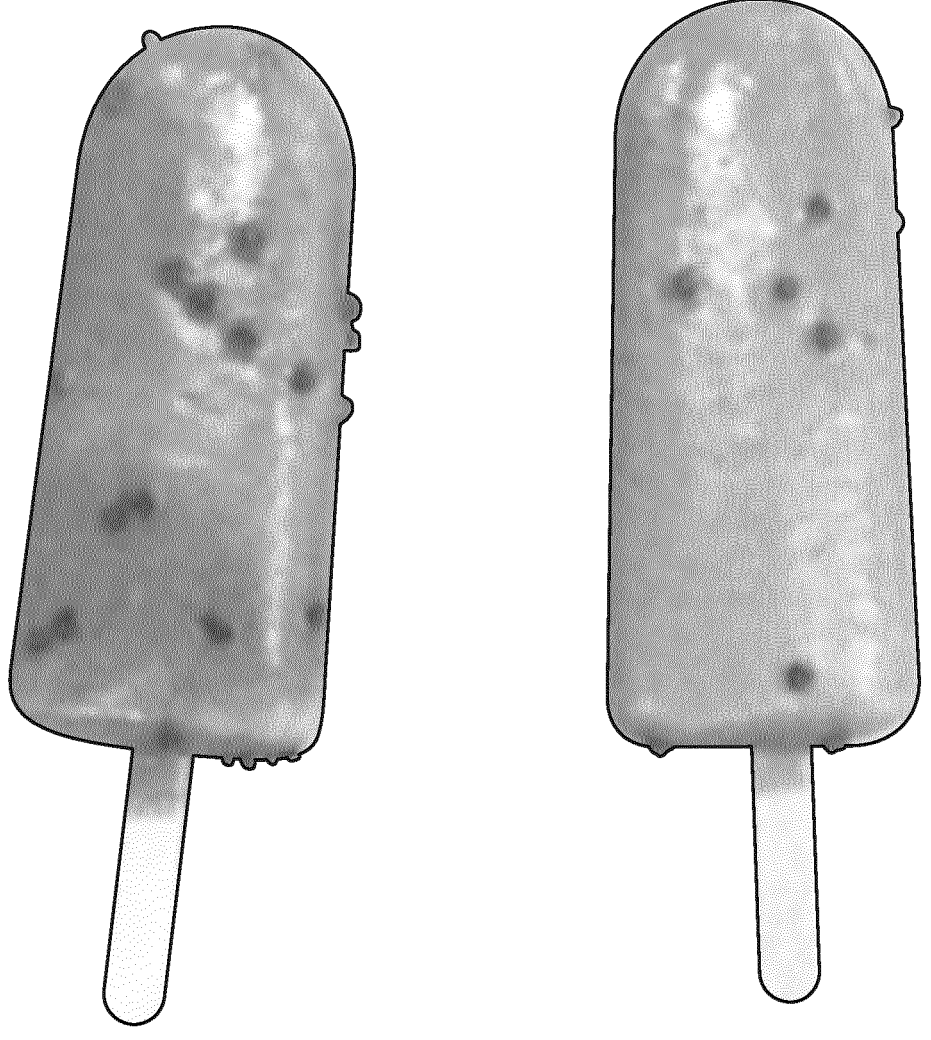
FIG. 6 is a photograph showing the third coating with chocolate chips inclusions on moulded frozen dairy bars, from the experimental example disclosed herein.

The third coating was tested on moulded ice cream bars. The third coating can be used for dipping at room temperature and provided the opportunity to add chocolate chips as inclusions without the risk of melting. In the trial, the chocolate chips in the coating maintained their integrity without melting for about 20 minutes. After that initial time, the fat phase of the coating dissolved the cocoa butter in the chips, releasing cocoa powder from the inclusions and darkening the coating (FIG. 6). In addition, the surface temperature, roughness and formulation of moulded bars contributed to less adherence of coating to the frozen dairy bar.

Conclusion

The trials developed a coating of cookie dough on ice cream that closely reproduces the target sensory attributes. For example, the second coating met the sensory and functional requirements to be applied in extruded bars. An alternative to chocolate chip inclusions are cocoa nibs, which was successfully added as inclusion to the second coating, providing the desired appearance for the cookie dough coated ice cream bars.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A composition for coating a frozen confectionary, the coating composition comprising:

a fat blend comprising (i) an emulsifier, (ii) at least one hardening fat selected from the group consisting of palm oil, palm oil mid fractions, palm oil soft fractions, and mixtures thereof, (iii) one or more soft oils selected from the group consisting of canola oil, sunflower oil, safflower oil, algal oil, peanut oil, olive oil, macadamia nut oil, hazelnut oil, avocado oil, and mixtures thereof, and (iv) anhydrous milk fat, wherein the fat blend is about 35 wt. % to about 55 wt. % of the coating composition;

flour; and sugars;

wherein the composition has a particle size of about 40 μm to about 200 μm.

2. The composition of claim 1, wherein the emulsifier is selected from the group consisting of soy lecithin, sunflower lecithin, canola lecithin, and mixtures thereof.

3. The composition of claim 1, wherein the fat blend consists of the at least one hardening fat, the one or more soft oils, the anhydrous milk fat, and the emulsifier, such that the only fats in the composition are the fat blend, any fat in the flour, and any fat in inclusions.

4. The composition of claim 1, wherein the at least one hardening fat is present in a total amount of about 35 wt. % to about 65 wt. % of the fat blend and/or about 12% to about 36% of the composition.

5. The composition of claim 1, wherein the one or more soft oils are present in a total amount that is about 35 wt. % to about 65 wt. % of the fat blend and/or about 12% to about 36% of the composition.

6. The composition of claim 1, wherein the anhydrous milk fat is about 10 wt. % to about 30 wt. % of the fat blend and/or about 4 wt. % to about 17 wt. % of the composition.

7. The composition of claim 1, wherein the sugars are present in a total amount of about 15 wt. % to about 50 wt. % of the composition.

8. The composition of claim 1, wherein the flour is about 10 wt. % to about 42 wt. % of the composition.

9. The composition of claim 1, further comprising inclusions that are at least one of chocolate chips or cocoa nibs.

10. The composition of claim 1, wherein the particle size is about 90 μm to about 120 μm.

11. The composition of claim 1, wherein the sugars are present in a total amount of about 20 wt. % to about 25 wt. % of the composition.

12. The composition of claim 1, wherein the sugars comprise one or more table sugars and one or more brown sugars.

13. The composition of claim 1, wherein the flour is about 20 wt. % to about 30 wt. % of the composition.

14. The composition of claim 1, wherein the emulsifier is in an amount of 0.1 wt. % to 2.0 wt. % of the composition.

15. A method of coating a frozen confectionary, the method comprising applying a composition to the frozen confectionary, the coating composition comprising:

a fat blend comprising (i) an emulsifier, (ii) at least one hardening fat selected from the group consisting of palm oil, palm oil mid fractions, palm oil soft fractions, and mixtures thereof, (iii) one or more soft oils selected from the group consisting of canola oil, sunflower oil, safflower oil, algal oil, peanut oil, olive oil, macadamia nut oil, hazelnut oil, avocado oil, and mixtures thereof, and (iv) anhydrous milk fat, wherein the fat blend is about 35 wt. % to about 55 wt. % of the coating composition;

flour; and sugars; wherein the composition has a particle size of about 40 μm to about 200 μm.

16. The method of claim 15, wherein the applying of the composition to the frozen confectionary is performed at a temperature of about 24° C. to about 50° C.

17. The method of claim 15, wherein the applying of the composition to the frozen confectionary is performed by one or more of dipping, enrobing or layering.

18. A method of making a composition for coating a frozen confectionary, the method comprising milling a mixture to a particle size of about 40 μm to about 200 μm, the mixture comprising a fat blend comprising (i) an emulsifier, (ii) at least one hardening fat selected from the group consisting of palm oil, palm oil mid fractions, palm oil soft fractions, and mixtures thereof, (iii) one or more soft oils selected from the group consisting of canola oil, sunflower oil, safflower oil, algal oil, peanut oil, olive oil, macadamia nut oil, hazelnut oil, avocado oil, and mixtures thereof, and (iv) anhydrous milk fat, wherein the fat blend is about 35 wt. % to about 55 wt. % of the coating composition; the mixture further comprises flour and sugars.

\* \* \* \* \*